(12) United States Patent  (10) Patent No.: US 7,936,142 B2
Otsuka et al.  (45) Date of Patent:  May 3, 2011

(54) PORTABLE DRILLING DEVICE

(75) Inventors: Kenji Otsuka, Tokyo (JP); Osamu Asano, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 380 days.

(21) Appl. No.: 12/159,174

(22) PCT Filed: Dec. 13, 2006

(86) PCT No.: PCT/JP2006/324843
§ 371 (c)(1),
(2), (4) Date: Jun. 25, 2008

(87) PCT Pub. No.: WO2007/074647
PCT Pub. Date: Jul. 5, 2007

(65) Prior Publication Data
US 2009/0196696 A1    Aug. 6, 2009

(30) Foreign Application Priority Data

Dec. 26, 2005  (JP) ................................. 2005-373095
Mar. 10, 2006  (JP) ................................. 2006-066475

(51) Int. Cl.
*G05B 11/28*  (2006.01)
(52) U.S. Cl. ........ 318/599; 318/811; 318/461; 388/937; 388/800; 173/5; 173/7; 173/179
(58) Field of Classification Search .................. 388/937, 388/800, 804, 806, 811, 815, 819; 318/432, 318/811, 599, 461; 173/5, 7, 180, 181, 176, 173/179
See application file for complete search history.

(56) References Cited

U.S. PATENT DOCUMENTS

| 3,585,476 | A | * | 6/1971 | Rutchik | ........................ 318/249 |
| 3,767,313 | A | * | 10/1973 | Bohoroquez et al. | ........... 408/14 |
| 4,604,006 | A | | 8/1986 | Shoji et al. | |

(Continued)

FOREIGN PATENT DOCUMENTS

JP  62-6925  2/1987

(Continued)

OTHER PUBLICATIONS

Supplementary European Search Report issued Dec. 10, 2008 in Application No. EP 06 83 4598.

(Continued)

*Primary Examiner* — Rina I Duda
(74) *Attorney, Agent, or Firm* — Wenderoth, Lind & Ponack, L.L.P.

(57) ABSTRACT

A drilling device prevents recurrence of an overload condition after occurrence of the overload condition, thereby improving operability and safety in the drilling device. A motor for rotating a drill is connected to an AC power source through a motor control unit, a current detector, and a power switch. A magnet is also connected to the AC power source through the power switch and a full-wave rectifier. The motor control unit rotationally drives the motor on the basis of a signal sent from a main control unit according to a state in which a motor start switch is on. The main control unit controls the motor control unit to gradually reduce a supply voltage to the motor when the motor becomes overloaded, to gradually increase the voltage to the normal power supply condition when the overload condition is vanished, and to stop power supply to the motor if the overload condition continues for a predetermined period.

20 Claims, 6 Drawing Sheets

U.S. PATENT DOCUMENTS

| | | | |
|---|---|---|---|
| 4,688,970 A * | 8/1987 | Eckman | 408/9 |
| 5,014,793 A * | 5/1991 | Germanton et al. | 173/181 |
| 5,062,743 A | 11/1991 | Wieland et al. | |
| 7,093,668 B2 * | 8/2006 | Gass et al. | 173/2 |
| 7,235,940 B2 * | 6/2007 | Bosch et al. | 318/432 |
| 2004/0179829 A1 * | 9/2004 | Phillips et al. | 388/804 |
| 2005/0025586 A1 | 2/2005 | Mikiya et al. | |
| 2005/0248320 A1 * | 11/2005 | Denning | 320/141 |

FOREIGN PATENT DOCUMENTS

| | | |
|---|---|---|
| JP | 6-143015 | 5/1994 |
| JP | 6-233499 | 8/1994 |
| JP | 2005-52914 | 3/2005 |

OTHER PUBLICATIONS

International Search Report issued Mar. 20, 2007 in the International (PCT) Application No. PCT/JP2006/324843.

Chinese Office Action issued Sep. 18, 2009 in Application No. 200680049395.8.

Japanese Office Action, with English translation, issued Aug. 4, 2010 in connection with corresponding Japanese Patent Application No. 2006-066475.

* cited by examiner

[Fig. 1]
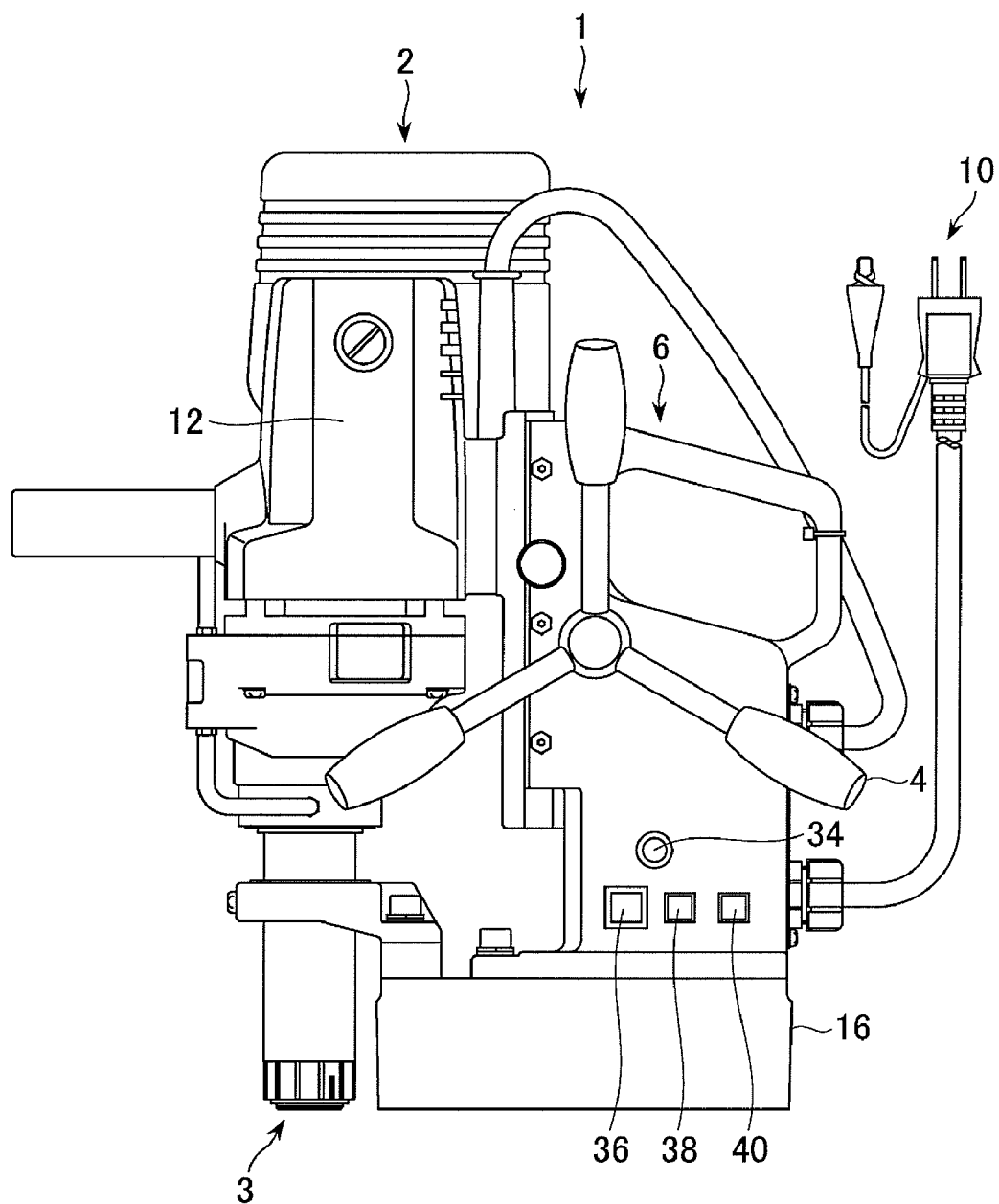

[Fig. 2]
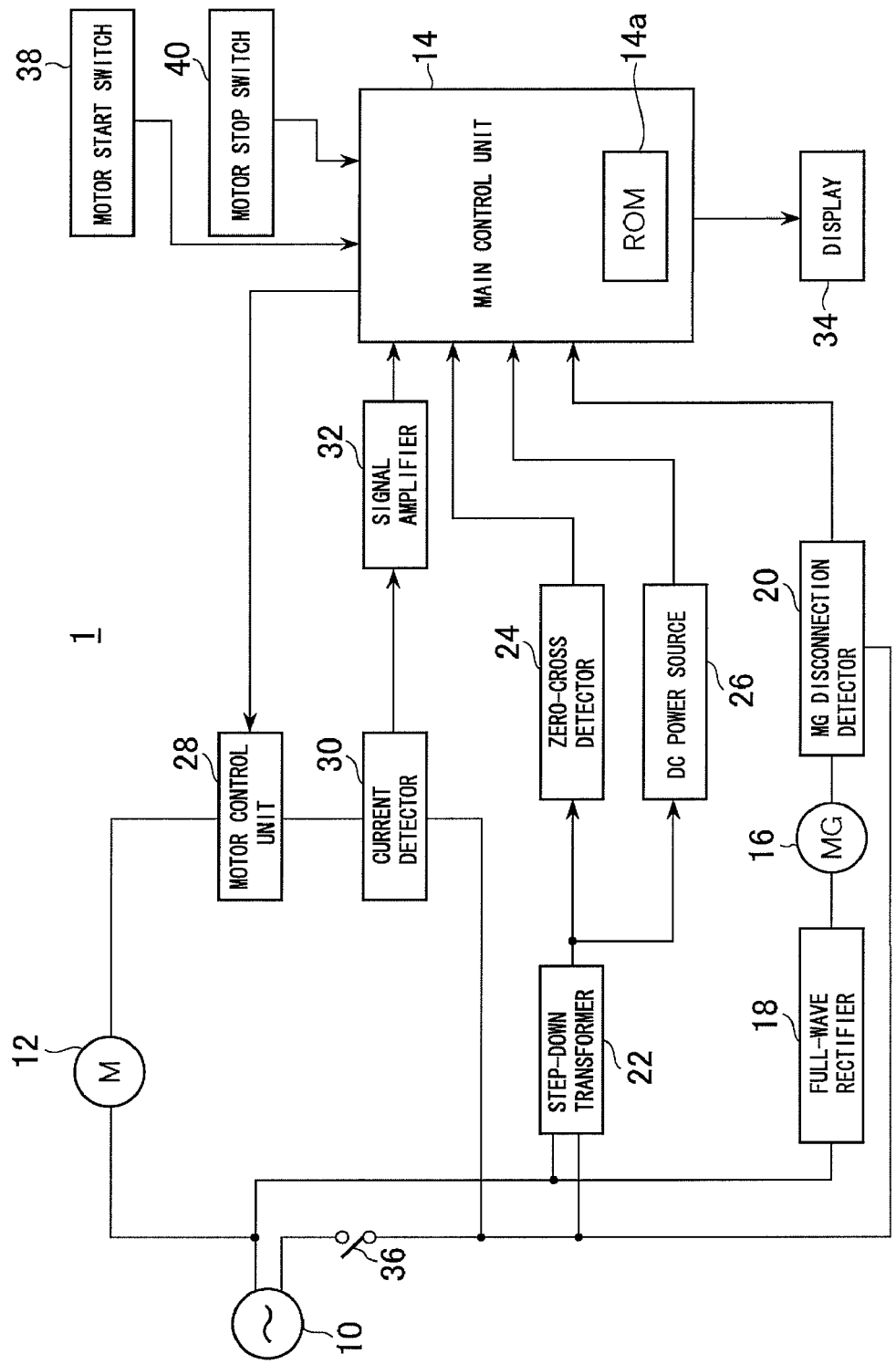

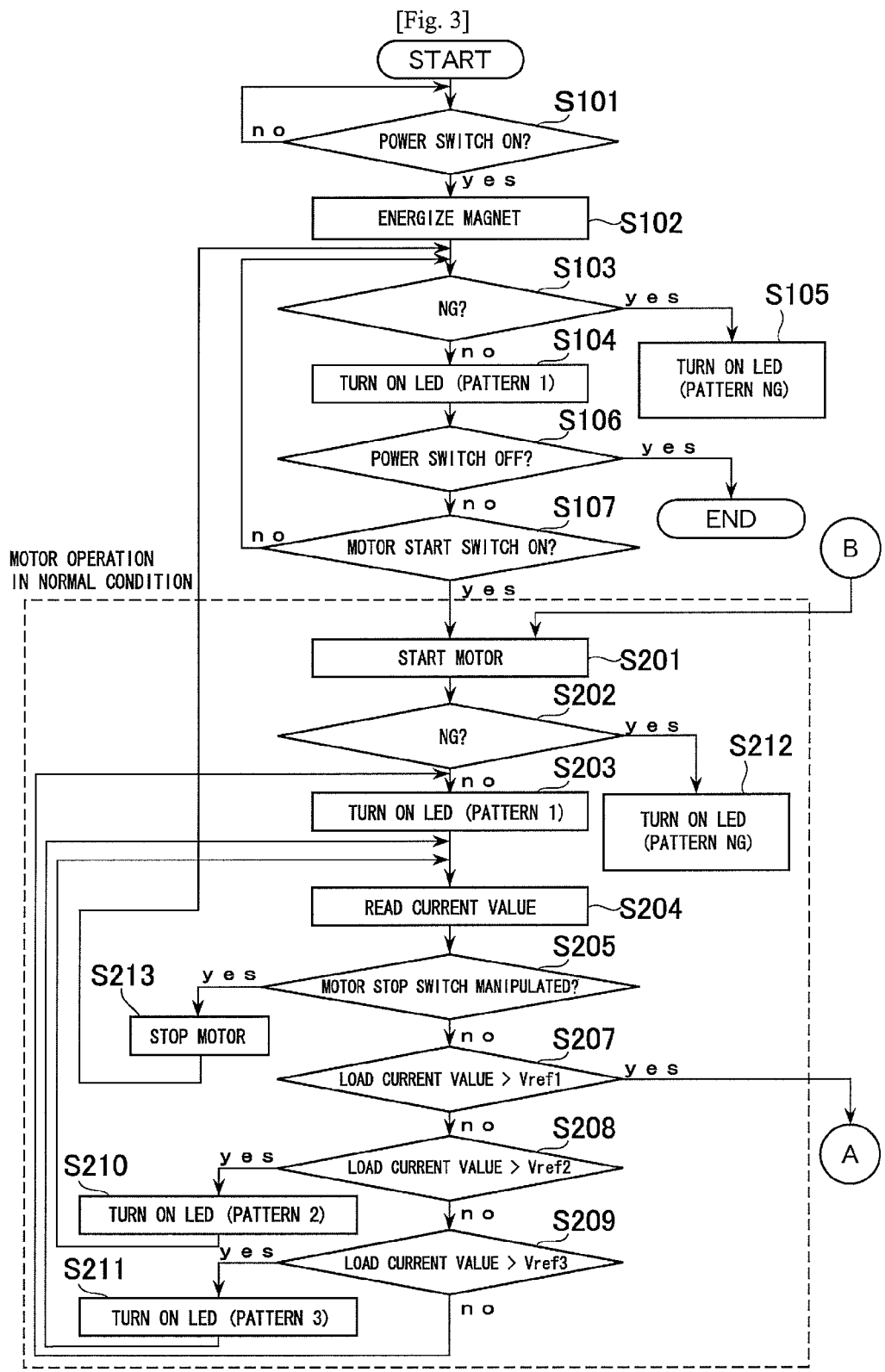
[Fig. 3]

[Fig. 4]
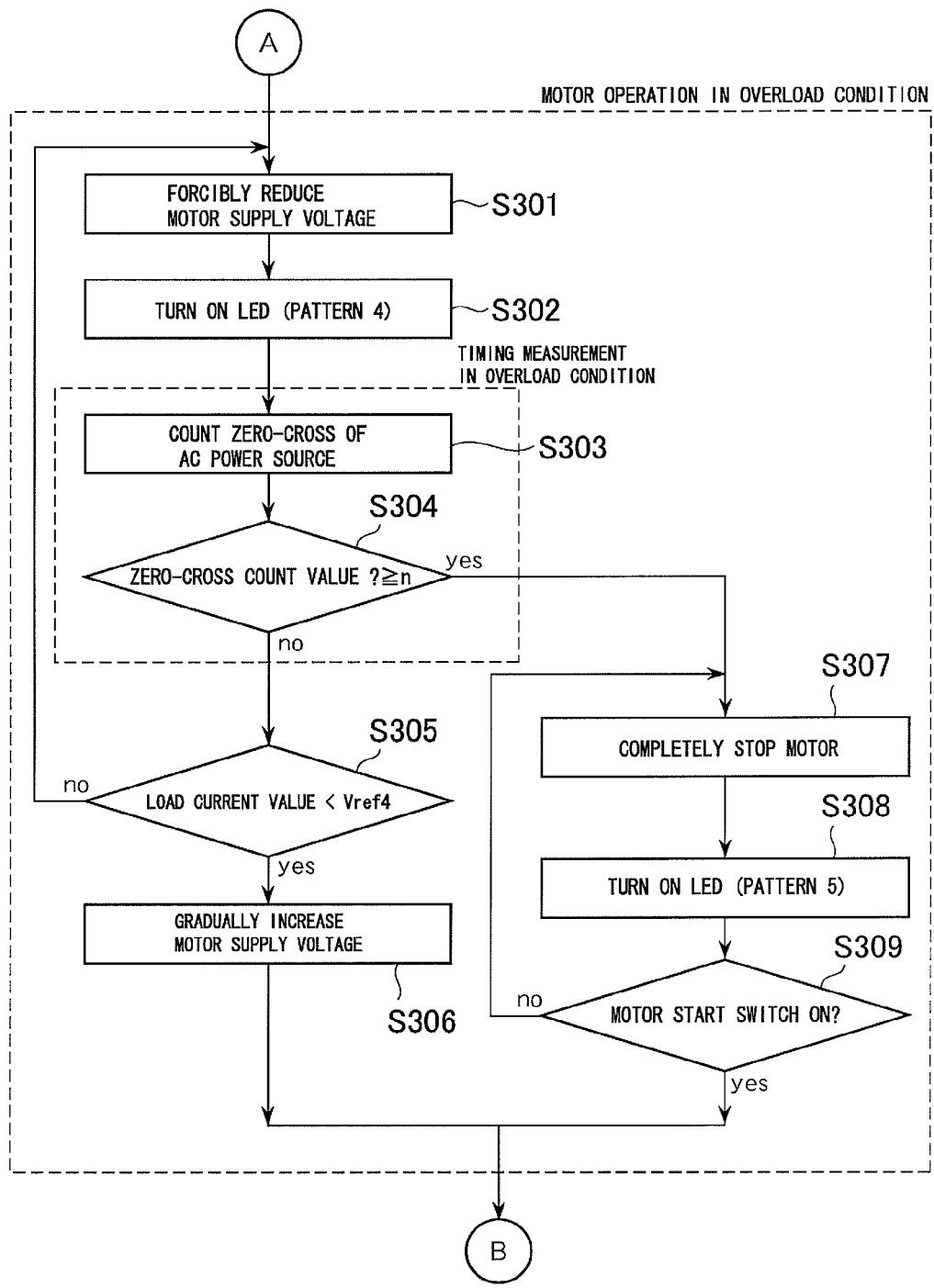

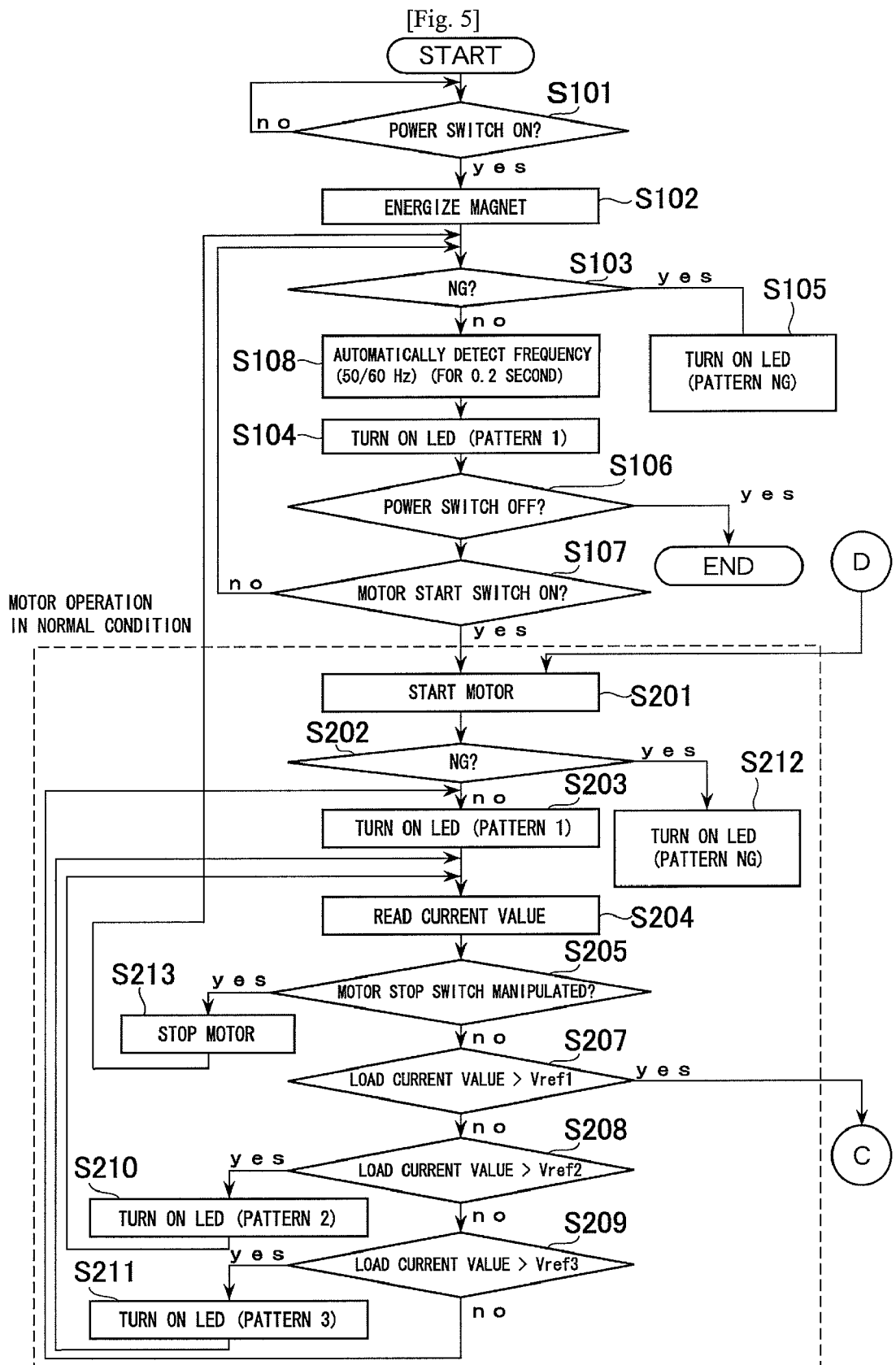
[Fig. 5]

[Fig. 6]
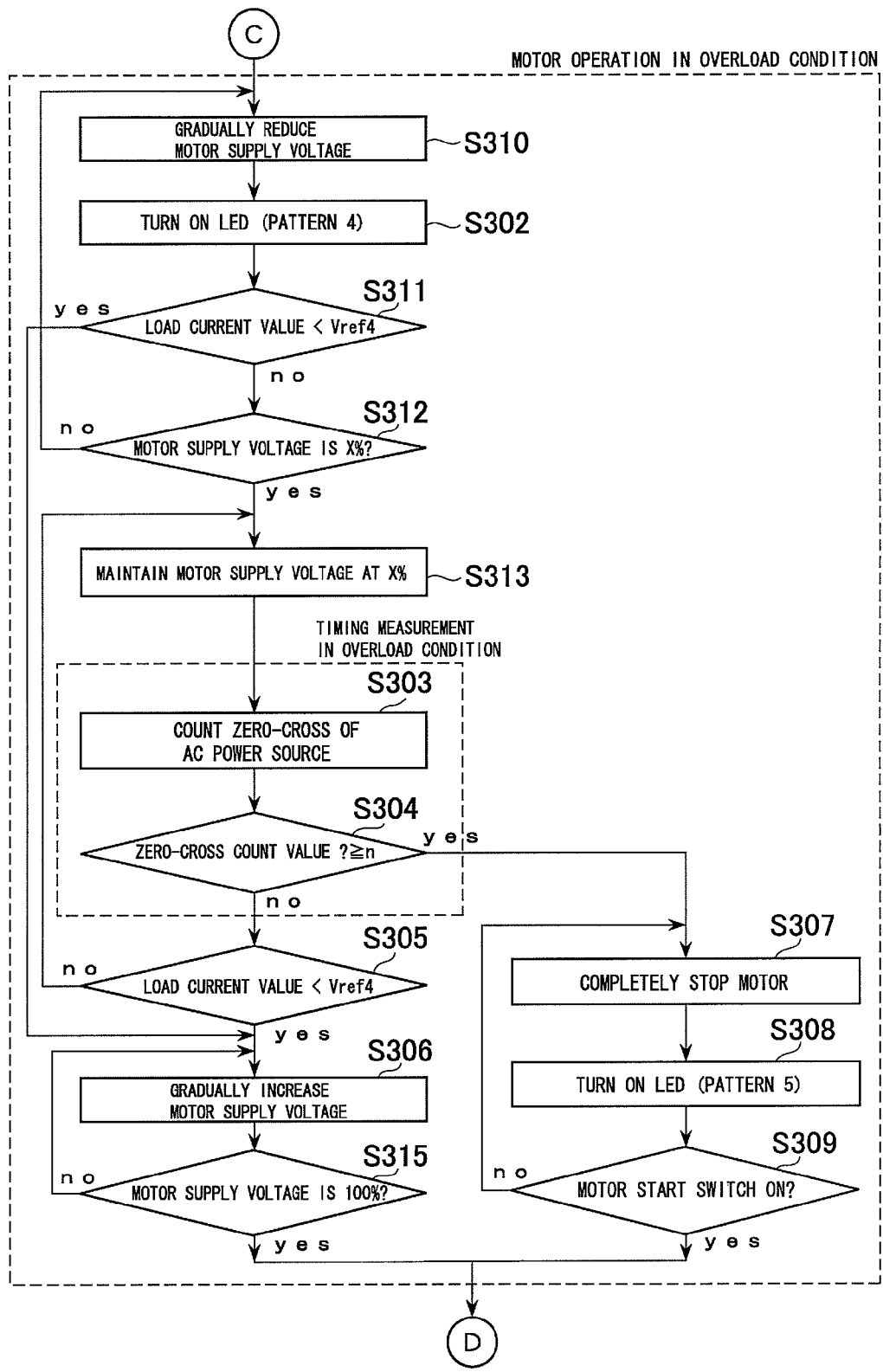

PORTABLE DRILLING DEVICE

TECHNICAL FIELD

The present invention relates to a portable drilling device having a structure in which a body thereof can be secured to a workpiece by means of an electromagnet or the like, and a cutting tool, such as a drill, attached to an output shaft of a motor is manually moved toward and away from the workpiece.

BACKGROUND ART

As machine tools for drilling holes in a workpiece, there exist portable drilling devices having portability and a structure in which a body thereof can be secured to a workpiece by means of an attracting force of an electromagnet, a vise, or the like. Generally, drilling devices have a structure in which a drill is connected directly to a drive motor (hereinafter, referred to as "a motor" for short). A load acting on the drill significantly fluctuates according to a contact condition of the drill with the workpiece, a downward force applied to the drill, material properties of the workpiece, and so on. This fluctuation is transmitted directly to the motor. Therefore, in a case where a low-power motor is used, if an overload condition continues for a long period, the motor may burn out due to an overcurrent generated in the overload condition.

There is known a drilling device in which, for example, different first and second reference levels are defined for preventing overload of a motor. When a load current exceeds the first reference level, an alarm is generated. When the load current exceeds the second reference level, an alarm is generated and power supply to the motor is stopped. Such a drilling device is disclosed in, for example, Patent Document 1 below.

There is also known an electric drilling device in which a current flowing through a motor is interrupted when a load current exceeds a reference value, and power supply to the motor is automatically resumed after a lapse of a predetermined period after the load current is reduced to the reference value or less. Such an electric drilling device is disclosed in, for example, Patent Document 2 below.

Patent Document 1: Japanese Examined Patent Application Publication No. 62-6295
Patent Document 2: Japanese Unexamined Patent Application Publication No. 2005-52914

DISCLOSURE OF THE INVENTION

Problems to be Solved by the Invention

In the configuration of the drilling device in Patent Document 1, if the load current exceeds the second reference level, a relay of a power supply circuit of the motor is turned off to stop power supply, and this state is maintained. Therefore, unless a power switch is turned off to reset the motor to the initial condition, power cannot be supplied again to the motor. In other words, it is troublesome to restart the motor, and thus there is room for improvement in workability.

In the configuration of the electric drilling device in Patent Document 2, after a lapse of the predetermined period after current interruption due to detection of an overload condition, a power of the same level as that before the current interruption is supplied to the motor even if the overload condition remains unchanged. In other words, a torque of the same level as that before the current interruption is generated, which is undesirable for safety reasons.

Further, if the motor is suddenly stopped by interrupting power supply to the motor according to detection of an overload condition, a rotational driving force by the motor is removed from a cutting edge of a cutting tool, while an inertia force and an urging force (an axial force of the drill) which urges the cutting edge against the workpiece are applied. In the resultant force of these forces applied from the cutting edge to the workpiece, the ratio of the axial component to the rotational component is larger than that in a state in which power is supplied to the motor. Thus, a reaction force applied from the workpiece to the cutting edge might cause breakage of the cutting edge, resulting in impossibility of continuous drilling operation.

In view of the foregoing, it is an object of the present invention to prevent recurrence of an overload condition by automatically restoring the motor if the overload condition is vanished after occurrence of the overload condition and by not restoring the motor if the overload condition continues for a predetermined period, thereby improving operability, safety, and workability.

Means for Solving the Problems

A portable drilling device according to the present invention includes a motor as a driving source for rotating a cutting tool such as a drill, a fixing unit for fixing a body including the motor to a workpiece, a motor control unit for rotationally driving the motor according to an on state of a motor start switch, and a main control unit for controlling the motor control unit. The main control unit includes a first control unit for controlling the motor control unit so as to reduce power supply to the motor when the motor becomes overloaded, and a second control unit for controlling the motor control unit so as to normally supply power to the motor when the overload condition is vanished. When the motor becomes overloaded, the first control unit is operated to reduce a supply voltage to the motor, while when the overload condition is vanished, the second control unit is operated to automatically restore power supply to the normal condition, thereby preventing recurrence of the overload condition.

Specifically, the first control unit can gradually reduce the supply voltage to the motor when the motor becomes overloaded.

More specifically, the second control unit can gradually increase the supply voltage to the motor to the normal power supply condition when the overload condition is vanished.

The main control unit may further include a third control unit for controlling the motor control unit so as to stop power supply to the motor if the overload condition continues for a predetermined period.

Specifically, the main control unit can control the motor control unit so as to start power supply to the motor when the motor start switch is turned on in a state in which the third control unit is in operation.

More specifically, when the first, second, and third control units are operated, the main control unit can execute display control such that a light-emitting element is turned on in respective different colors and/or different ways according to respective control states of the first, second, and third control units.

The main control unit may further include a fourth control unit. When a load current of the motor is not less than a predetermined reference value and the supply voltage to the motor becomes a predetermined value according to operation of the first control unit, the fourth control unit maintains a motor drive state for a predetermined period with the supply voltage to the motor being at the predetermined value.

Specifically, the main control unit can define the predetermined value of the motor supply voltage to be a value at which the motor does not burn out even in a locked state.

More specifically, the main control unit can gradually increase the supply voltage to the motor to the normal power supply condition by means of the second control unit when the load current of the motor is less than the reference value, in a case where the fourth control unit is operated.

Furthermore, the fixing unit is made of magnet for fixing the body including the motor to a workpiece by means of an electromagnetic force. The main control unit can rotationally drive the motor by means of the motor control unit according to a state in which the magnet is energized.

BRIEF DESCRIPTION OF THE DRAWINGS

FIG. 1 is an external view of a magnetic base drilling device according to an embodiment of the present invention.

FIG. 2 is a block diagram showing a structure of the magnetic base drilling device according to the present invention.

FIG. 3 is a flow chart showing the operation of the magnetic base drilling device according to the present invention.

FIG. 4 is a flow chart showing processes following FIG. 3.

FIG. 5 is a flow chart showing the operation of a magnetic base drilling device according to another embodiment of the present invention.

FIG. 6 is a flow chart showing processes following FIG. 5.

EXPLANATION OF REFERENCE SYMBOLS 1 magnetic base drilling device
2 body
3 chuck
4 operating handle
6 carrying handle
10 AC power source
12 motor
14 main control unit
14a ROM
16 magnet
20 MG disconnection detector
22 step-down transformer
24 zero-cross detector
28 motor control unit
30 current detector
32 signal amplifier
34 display
36 power switch
38 motor start switch
40 motor stop switch

DETAILED DESCRIPTION OF THE INVENTION

A magnetic base drilling device according to an embodiment of a portable drilling device of the present invention will now be described with reference to FIGS. 1 to 4. FIG. 1 is an external view of a magnetic base drilling device according to the present invention. FIG. 2 is a block diagram showing a control structure of the magnetic base drilling device. The magnetic base drilling device 1 is mainly composed of a body 2, and a supporting part 6 for supporting a cutting tool held by a chuck 3 such that the cutting tool can be moved toward and away from a workpiece by rotating a operating handle 4. The magnetic base drilling device 1 includes a motor 12 powered by, for example, a 100 V AC power source 10, a main control unit 14 for motor control and display control of the motor control status, a magnet (MG) 16 for, when energized, generating a predetermined magnetic force, a full-wave rectifier 18 for supplying to the magnet 16 a DC output obtained by full-wave rectifying of the AC power source 10, a MG disconnection detector 20 for detecting disconnection of the magnet 16, a step-down transformer 22 for transforming the AC power source 10 to a predetermined low voltage, a zero-cross detector 24 for detecting zero-cross of a low-voltage output of the step-down transformer 22, a DC power source 26 for supplying DC power to the main control unit 14 and the like, a motor control unit 28 for controlling the rotation of the motor 12, a current detector 30 for detecting a current flowing through the motor 12, a signal amplifier 32 for amplifying a detection signal generated by the current detector 30, a display 34 connected to the main control unit 14 and performing alarm display by means of an LED, a power switch 36 for turning on/off the power source of the whole of the magnetic base drilling device 1, a motor start switch 38 for turning on power supply to the motor 12, and a motor stop switch 40 for turning off power supply to the motor 12.

The main control unit 14 is, for example, a peripheral interface controller (PIC) composed of a one-chip microcomputer which incorporates a CPU and an A/D converter. A built-in ROM 14a stores programs for executing processes shown in FIG. 3, for example. The PIC series by MICROTIP TECHNOLOGY is an example of commercially available PIC.

The magnet 16 has a core and a winding which, when applied with DC power from the full-wave rectifier 18, can generate a magnetic attracting force for fixing the body of the magnetic base drilling device 1 to a workpiece. The magnet 16 is disposed in a base portion or the like of the magnetic base drilling device 1.

The MG disconnection detector 20 has a circuit which, in conjunction with a power supply switch for the magnet 16, detects whether or not the magnet 16 is energized to detect disconnection of the magnet 16, so that it is possible to give an alarm for disconnection of the magnet 16.

The step-down transformer 22 is a low-power transformer which has a primary winding connected to the AC power source 10 and a secondary winding for supplying a low AC voltage to the zero-cross detector 24 and the DC power source 26.

The zero-cross detector 24 has a circuit configuration in which the timing at which a sine wave of the AC power source 10 crosses the zero level is detected by means of a photocoupler or the like and the detected timing is transmitted to the main control unit 14.

The DC power source 26 includes a full-wave rectifier for full-wave rectifying of an output of the secondary winding of the step-down transformer 22, and a smoothing circuit and a voltage stabilizing circuit for respectively smoothing and stabilizing a DC output full-wave rectified by the full-wave rectifier. The DC power source 26 supplies the generated DC output to the main control unit 14 and other circuits.

The motor control unit 28 includes, for example, a triac, which is one of semiconductor controlling elements, and a controlling circuit for controlling a gate of the triac.

The current detector 30 includes, for example, a current transformer (CT) connected in series to the motor 12. A detection signal generated by the current detector 30 is amplified by means of the signal amplifier 32 having an operational amplifier and then transmitted to the main control unit 14. The detection signal transmitted to the main control unit 14 is converted to a digital value by means of the A/D converter incorporated in the main control unit 14.

The display 34 includes, for example, an LED which can emit green, yellow, and red light. Under control of the main control unit 14, this LED can emit light in any one of the above colors, as well as emit light in various lighting modes, such as emitting light continuously, blinking at long intervals, and blinking at short intervals. In this embodiment, the following lighting modes are provided for the display 34.

Pattern 1: lighting in green (in operation)
Pattern 2: lighting in red (alarm)
Pattern 3: lighting in yellow (warning)
Pattern 4: high-speed blinking in red (alarm)
Pattern 5: blinking in green (alarm)
Pattern NG: blinking in red (alarm)

FIG. 3 is a flow chart showing the operation of the magnetic base drilling device 1. FIG. 4 is a flow chart showing processes following FIG. 3. In FIG. 3, steps S101 to S107 show processes for energizing the magnet 16 and confirming the energization, while steps S201 to S213 show processes for operating the motor 12 in the normal condition. In FIG. 4, steps S301 to S309 show processes for operating the motor 12 in the overload condition. Steps S303 and S304 show processes for measuring an overload time. In the processes described below, four reference values Vref (Vref1, Vref2, Vref3, Vref4) are used, which have the relationship of Vref1>Vref2>Vref3>Vref4.

First, the main control unit 14 determines whether or not the power switch 36 is turned on (S101). If the power-on state is not confirmed, the main control unit 14 stands by, while if the power is on (S101: yes), the main control unit 14 energizes the magnet 16 (S102). The main control unit 14 then determines whether or not the magnet 16 is energized, according to an output of the MG disconnection detector 20 (S103). If the output of the MG disconnection detector 20 is not NG, i.e., the energization is confirmed (S103: no), the main control unit 14 turns on the LED of the display 34 in green (S104). If the energization is not confirmed (S103: yes), the main control unit 14 blinks the LED of the display 34 in red (S105). A user can notice abnormality according to this light, thereby taking action, such as turning off the power, inspecting the device, and the like. Then, the main control unit 14 determines whether or not the power switch 36 is turned off (S106). If the power-off state is confirmed (S106: yes), the main control unit 14 ends the process (END). If the power is not off (S106: no), the main control unit 14 determines whether or not the motor start switch 38 is on (S107). If the switch is on (S107: yes), the main control unit 14 activates the motor control unit 28 to start the motor 12 (S201). If the on state of the motor start switch 38 is not confirmed (S107: no), the main control unit 14 returns the process back to step S103 and then executes subsequent processes.

The main control unit 14 activates the motor control unit 28 to rotationally drive the motor 12 by phase control based on a predetermined energization angle. In this case, the main control unit 14 uses zero-cross pulse signals detected by the zero-cross detector 24 as external interrupt signals, thereby executing a process for activating motor control by the motor control unit 28 at every half cycle. Then, the main control unit 14 again determines whether or not the magnet 16 is energized, according to the output of the MG disconnection detector 20 (S202). If the energization is confirmed (S202: no), the main control unit 14 turns on the LED of the display 34 in green (S203), while if the energization is not confirmed (S202: yes), the main control unit 14 blinks the LED of the display 34 in red (S212). After confirming the energization of the magnet 16, the main control unit 14 then reads a load current value IL detected by means of the current detector 30 and the signal amplifier 32 (S204).

Then, the main control unit 14 determines whether or not the motor stop switch 40 is manipulated (S205). If the motor stop switch 40 is manipulated, the main control unit 14 interrupts power supply to the motor 12 (S213), and then returns the process back to step S103. If the motor stop switch 40 is not manipulated, the main control unit 14 determines whether or not the read load current value IL is larger than the reference value Vref1 (S207). The reference value Vref1 is a level at which the motor 12 should be immediately stopped, i.e., a reference current value by which whether or not the motor 12 is overloaded is determined At step S207, if the condition of IL≦Vref1 is satisfied, i.e., the motor is not overloaded (S207: no), the main control unit 14 now compares the load current value IL with the reference value Vref2 (S208). The reference value Vref2 is a current value corresponding to a high load condition. The motor 12 is not necessarily stopped at this current value. If the condition of IL>Vref2 is satisfied at step S208 (S208: yes), the main control unit 14 turns on the LED of the display 34 in red to warn the user of possibility of an overload condition (S210), and then advances the process to step S204 and executes subsequent processes.

If the condition of IL≦Vref2 is satisfied at step S208 (S208: no), the main control unit 14 compares the load current value IL with the reference value Vref3 (S209). The reference value Vref3 is a reference current value by which whether or not the motor is operated in the normal load condition is determined. If the condition of IL>Vref3 is satisfied (S209: yes), the main control unit 14 turns on the LED of the display 34 in yellow to warn the user that the load is large (S211), and then advances the process to step S204. If the condition of IL≦Vref3 is satisfied (S209: no), the main control unit 14 does not activate the display 34 because the motor is operated in the normal load condition, and then advances the process to step S203 and executes subsequent processes.

If the condition of IL>Vref1 is satisfied at step S207 (S207: yes), the main control unit 14 executes control for forcibly reducing the supply voltage to the motor 12 in order to avoid the overload condition (S301 in FIG. 4). The main control unit 14 then blinks the LED of the display 34 in red at a high frequency (S302) to warn the user that the driving force of the motor has been changed. The main control unit 14 now receives zero-cross signals from the zero-cross detector 24, and then starts zero-cross counting (S303). Then, the main control unit 14 compares the zero-cross count value at step S303 with a predetermined value n (S304). For example, a zero-cross count value of n represents a lapse of several seconds after occurrence of the overload condition.

If the condition of "zero cross count value≧n" is not satisfied at step S304 (S304: no), the main control unit 14 compares the load current value IL with the reference value Vref4 (S305). The reference value Vref4 is a reference current value by which whether or not the load is reduced is determined, after the supply voltage is once forcibly reduced due to detection of the overload condition by the current detector 30 and the signal amplifier 32. If the condition of IL<Vref4 is satisfied at step S305, the main control unit 14 controls the motor control unit 28 to gradually increase the motor supply voltage (gradual increase in motor supply voltage) (S306), and then advances the process to step S201 in FIG. 3. With the control at step S306, it is possible to prevent the motor 12 from suddenly rotating at a high speed, whereby operability and safety can be improved.

If the condition of "zero-cross count value≧n" is satisfied at step S304 (S304: yes), the main control unit 14 sends to the motor control unit 28 a signal for completely stopping the motor 12. In response to the signal, the motor control unit 28 stops power supply to the motor 12 (S307). Then, the main control unit 14 blinks the LED of the display 34 in green (S308) to warn the user that the motor 12 has been temporarily forcibly stopped. Further, the main control unit 14 determines whether or not the motor start switch 38 is turned on (S309). If the motor start switch 38 is on (S309: yes), the main control unit 14 advances the process to step S201 in FIG. 3 to execute control for operating the motor in the normal condition. As described above, after a lapse of a predetermined period after occurrence of the overload condition, the motor 12 cannot be activated unless the user manipulates the motor start switch 38, whereby safety is improved. If the motor start switch 38 is off (S309: no), the main control unit 14 advances the process to step S307 and then executes subsequent processes.

With the above-described control, it is possible to improve operability, to prevent a cutting tool such as a drill from being damaged, to prevent the motor from burning out, and to improve safety in the magnetic base drilling device 1.

FIG. 5 is a flow chart showing processes in a magnetic base drilling device according to a second embodiment of the portable drilling device according to the present invention. FIG. 6 is a flow chart showing processes following FIG. 5. In FIGS. 5 and 6, steps having the same processes as those in steps in FIGS. 3 and 4 are denoted by the same numerals.

First, the main control unit 14 determines whether or not the power switch 36 is turned on at step S101 in FIG. 5. If the power-on state is not confirmed, the main control unit 14 stands by, while if the power is on, the main control unit 14 energizes the magnet 16 (S102). The main control unit 14 then determines whether or not the magnet 16 is energized (S103). If the energization of the magnet 16 is not confirmed (S103: no), the main control unit 14 blinks the LED of the display 34 in red (S105). These processes are the same as those in the embodiment shown in FIG. 3. In the second embodiment shown in FIG. 5, if the energization of the magnet 16 is confirmed (S103: no), the main control unit 14 advances the process to step S108 for determining whether a frequency of the AC power source 10 is 50 Hz or 60 Hz. Specifically, the main control unit 14 detects the power source frequency according to a count value obtained by counting zero-cross pulses detected by the zero-cross detector 24 for 0.2 second.

Then, the main control unit 14 turns on the LED of the display 34 in green (S104), and determines whether or not the power switch 36 is turned off (S106). If the power-off state is confirmed (S106: yes), the main control unit 14 ends the process (END). If the power is not off (S106: no), the main control unit 14 determines whether or not the motor start switch 38 is on (S107). If the switch is not on (S107: no), the main control unit 14 returns the process back to step S103.

If the switch is on at step S107 (S107: yes), the main control unit 14 advances the process to a process loop for operating the motor in the normal condition. As is the case with FIG. 3, the main control unit 14 activates the motor control unit 28 to start the motor 12 (S201). Then, the main control unit 14 determines whether or not the magnet 16 is energized (S202). If the energization is confirmed (S202: no), the main control unit 14 turns on the LED of the display 34 in green (S203), while if the energization is not confirmed (S202: yes), the main control unit 14 blinks the LED of the display 34 in red (S212). After confirming the energization of the magnet 16, the main control unit 14 now reads the load current value IL (S204), and then determines whether or not the motor stop switch 40 is manipulated (S205). If the motor stop switch 40 is manipulated (S205: yes), the main control unit 14 stops the motor 12 (S213) and then returns the process back to step S103. If the motor stop switch 40 is not manipulated (S205: no), the main control unit 14 compares the read load current value IL with the reference values Vref (S207 to S209). The reference value Vref1 used at step S207 is a current value by which whether or not the motor 12 is overloaded is determined. If the condition of IL≦Vref1 is satisfied, i.e., the motor is not overloaded, the main control unit 14 then compares the load current value IL with the reference value Vref2 (S108). The reference value Vref2 is a current value corresponding to a high load condition. The motor 12 is not necessarily stopped at this current value. If the condition of IL>Vref2 is satisfied at step S208, the main control unit 14 turns on the LED of the display 34 in red to warn the user of possibility of an overload condition, and then advances the process to step S204 and executes subsequent processes.

If the condition of IL≦Vref2 is satisfied at step S208 (S208: no), the main control unit 14 compares the load current value IL with the reference value Vref3 (S209). The reference value Vref3 is a reference current value by which whether or not the motor is operated in the normal load condition is determined. If the condition of IL>Vref3 is satisfied (S209: yes), the main control unit 14 turns on the LED of the display 34 in yellow to warn the user that the load is large (S211), and then advances the process to step S204. If the condition of IL≦Vref3 is satisfied (S209: no), the main control unit 14 does not activate the display 34 because the motor is operated in the normal load condition, and then advances the process to step S203 and executes subsequent processes.

If the load current exceeds the reference value Vref1 at step S207 (S207: yes), the main control unit 14 executes processes for operating the motor in the overload condition in FIG. 6. First, the main control unit 14 gradually reduces the supply voltage to the motor 12, for several seconds (for example, four seconds), to X % of the supply voltage (for example, 35% of the rated voltage) at which there is no risk of burning out of the motor even if the motor 12 comes into a locked state (S310). The main control unit 14 then blinks the LED of the display 34 in red at a high frequency (S302) to warn the user that the driving force of the motor has been changed.

Then, the main control unit 14 compares the load current value IL with the reference value Vref4 (S311). The reference value Vref4 is a reference value by which whether or not the load is reduced is determined, after the motor 12 is determined to be overloaded. If the condition of IL<Vref4 is satisfied (S311: yes), the main control unit 14 advances the process to step S306 to execute control for gradually increasing the motor supply voltage. If the condition of IL≧Vref4 is satisfied (S311: no), the main control unit 14 determines whether or not the control at step S310 is completed, i.e., whether or not the motor supply voltage is reduced to X % (S312). If the motor supply voltage is not reduced to X % (S312: no), the main control unit 14 returns the process back to step S310 and then executes subsequent processes. If the motor supply voltage is reduced to X % (S312: yes), the main control unit 14 controls the motor control unit 28 so as to maintain the motor supply voltage at X % (S313).

Then, the main control unit 14 receives zero-cross signals from the zero-cross detector 24 and performs zero-cross counting (S303) in order to determine whether or not the motor control with the motor supply voltage maintained at X % is kept for a predetermined period (for example, several seconds). The main control unit 14 now compares the zero-cross count value at step S303 with the predetermined value n (S304). If the condition of "zero-cross count value≧n" is not satisfied (S304: no), the main control unit 14 determines whether or not the condition of IL<Vref4 is satisfied (S305).

If the condition of IL≧Vref4 is satisfied (S305: no), the main control unit 14 returns the process back to step S313 to continue to maintain the motor supply voltage at X %. If the condition of IL<Vref4 is satisfied (S305: yes), i.e., the load is reduced after the motor 12 is determined to be overloaded, the main control unit 14 controls the motor control unit 28 to gradually increase the motor supply voltage (S306). The main control unit 14 then determines whether or not the motor supply voltage reaches 100% (S315). If the motor supply voltage does not reach 100%, the main control unit 14 returns the process back to step S306 to control the motor control unit 28 to gradually increase the motor supply voltage. If the motor supply voltage reaches 100%, the main control unit 14 advances the process to step S201 in FIG. 5 and then executes subsequent processes.

If the condition of "zero-cross count value≧n" is satisfied (S304: yes), i.e., the predetermined period has past, the main control unit 14 stops power supply to the motor 12 (S307). The main control unit 14 then blinks the LED of the display 34 in green (S308) to warn the user that the motor 12 has been temporarily forcibly stopped. Then, the main control unit 14 determines whether or not the motor start switch 38 is turned on (S309). If the motor start switch 38 is on (S309: yes), the main control unit 14 advances the process to step S201 in FIG. 5 to execute control for operating the motor in the normal condition. If the motor start switch 38 is off (S309: no), the main control unit 14 advances the process to step S307 and then executes subsequent processes.

As described above, according to the processes in the second embodiment, the motor supply voltage is gradually reduced at step S310, whereby the force of the motor is reduced to prevent the cutting edge of the cutting tool from being damaged. Further, as is the case with the first embodiment, the motor supply voltage is maintained at the predetermined value at steps S312 and S313 in a state in which the load current value IL is larger than the reference value Vref4. Then, the motor is stopped or operated in the normal condition, according to the overload condition. Therefore, even if the process at step S307 for completely stopping the motor 12 is executed, damage on the cutting edge of the cutting tool can be prevented because the force has already been reduced. Further, as is the case with the first embodiment, it is possible to improve workability and to prevent the motor from burning out in the magnetic base drilling device.

Although some embodiments of the magnetic base drilling device according to the present invention have been described above, the main control unit 14 is not necessarily limited to a PIC. Alternatively, the main control unit 14 may be an integrated circuit (IC) or a circuit specifically designed to execute the processes in FIG. 3. In the motor control unit 28, a triac, which is suitable for simplifying a circuit configuration, is used as a semiconductor controlling element. Alternatively, other elements such as a gate turn off thyristor (GTO), and an insulated gate bipolar transistor (IGBT) may be used.

Further, the magnetic base drilling device 1 may be provided with an acceleration sensor for detecting occurrence of sideslip and the like of the magnetic base drilling device 1 in order to give an alarm of occurrence of the sideslip and the like. In the embodiments described above, a single LED is used for giving an alarm and a warning. Alternatively, three LEDs may be used, each of which emits monochromatic light of green (or blue), red, or yellow (or orange). Instead of the LED, text messages or pictographic characters of warning may be displayed on a liquid crystal display or the like.

Further, instead of the light-emitting element, an acoustic device (such as alarm call, warning sound, and voice message) may be used. Furthermore, the process at step S108 in FIG. 5 may be added between steps S103 and S104 in FIG. 3.

The invention claimed is:

1. A portable drilling device comprising:
    a drilling device body including a motor for rotating a cutting tool;
    a fixing unit for fixing the drilling device body;
    a motor control unit for rotationally driving the motor according to an on state of a motor start switch; and
    a main control unit for controlling the motor control unit, the main control unit comprising
        a first control unit for controlling the motor control unit so as to reduce power supply to the motor when the motor becomes overloaded,
        a second control unit for controlling the motor control unit so as to resume normal power supply to the motor when the overload condition is removed, and
        a fourth control unit for maintaining a motor drive state for a predetermined period with the supply voltage to the motor being at a predetermined value when a load current of the motor is not less than a predetermined reference value and the supply voltage to the motor becomes the predetermined value according to operation of the first control unit.

2. The portable drilling device according to claim 1, wherein the first control unit gradually reduces a supply voltage to the motor when the motor becomes overloaded.

3. The portable drilling device according to claim 1, wherein the second control unit gradually increases the supply voltage to the motor in order to resume the normal power supply when the overload condition is removed.

4. The portable drilling device according to claim 1, wherein the main control unit includes a third control unit for controlling the motor control unit so as to stop power supply to the motor if the overload condition is not removed and continues for a predetermined period.

5. The portable drilling device according to claim 4, wherein the main control unit controls the motor control unit so as to start power supply to the motor when the motor start switch is turned on in a state in which the third control unit is in operation.

6. The portable drilling device according to claim 4, wherein when the first, the second, and the third control units are operated, the main control unit executes display control such that a light-emitting element is turned on in respective different colors and/or different ways according to respective control states of the first, the second, and the third control units.

7. The portable drilling device according to claim 1, wherein the main control unit defines the predetermined value of the motor supply voltage to be a value at which thermal problems are not caused with regard to the motor even in a locked state.

8. The portable drilling device according to claim 7, wherein the main control unit gradually increases the supply voltage in order to resume the normal power supply via the second control unit when the load current of the motor is less than the reference value, in a case where the fourth control unit is operated.

9. The portable drilling device according to claim 1, wherein the fixing unit includes a magnet for fixing the drilling device body including the motor to a workpiece with an electromagnetic force, and wherein the main control unit rotationally drives the motor by means of the motor control unit according to a state in which the magnet is energized.

10. A portable drilling device comprising:
a drilling device body including a motor for rotating a cutting tool;
a motor control unit for rotationally driving the motor according to an on state of a motor start switch; and
a main control unit for controlling the motor control unit, the main control unit comprising
a first control unit for controlling the motor control unit so as to reduce power supply to the motor when the motor becomes overloaded,
a second control unit for controlling the motor control unit so as to resume normal power supply to the motor when the overload condition is removed,
a third control unit for controlling the motor control unit so as to stop power supply to the motor if the overload condition is not removed and continues for a predetermined period, and
a fourth control unit for maintaining a motor drive state for a predetermined period with the supply voltage to the motor being at a predetermined value when a load current of the motor is not less than a predetermined reference value and the supply voltage to the motor becomes the predetermined value according to operation of the first control unit.

11. The portable drilling device according to claim 10, further comprising a fixing unit for fixing the drilling device body to a workpiece.

12. The portable drilling device according to claim 10, wherein the first control unit gradually reduces a supply voltage to the motor when the motor becomes overloaded, and wherein the second control unit gradually increases the supply voltage to the motor in order to resume the normal power supply when the overload condition is removed.

13. A portable drilling device comprising:
a drilling device body including a motor for rotating a cutting tool;
a motor control unit for rotationally driving the motor according to an on state of a motor start switch; and
a main control unit for controlling the motor control unit, the main control unit comprising
first control means for controlling the motor control unit so as to reduce power supply to the motor when the motor becomes overloaded,
second control means for controlling the motor control unit so as to resume normal power supply to the motor when the overload condition is removed,
third control means for controlling the motor control unit so as to stop power supply to the motor if the overload condition is not removed and continues for a predetermined period, and
fourth control means for maintaining a motor drive state for a predetermined period with the supply voltage to the motor being at a predetermined value when a load current of the motor is not less than a predetermined reference value and the supply voltage to the motor becomes the predetermined value according to operation of the first control unit.

14. The portable drilling device according to claim 13, wherein the first control means gradually reduces a supply voltage to the motor when the motor becomes overloaded.

15. The portable drilling device according to claim 13, wherein the second control means gradually increases the supply voltage to the motor in order to resume the normal power supply when the overload condition is removed.

16. The portable drilling device according to claim 13, wherein the main control unit controls the motor control unit so as to start power supply to the motor when the motor start switch is turned on in a state in which the third control means is in operation.

17. The portable drilling device according to claim 13, wherein when the first control means, the second control means, and the third control means are operated, the main control unit executes display control such that a light-emitting element is turned on in respective different colors and/or different ways according to respective control states of the first control means, the second control means, and the third control means.

18. The portable drilling device according to claim 13, wherein the main control unit defines the predetermined value of the motor supply voltage to be a value at which thermal problems are not caused with regard to the motor even in a locked state.

19. The portable drilling device according to claim 18, wherein the main control unit gradually increases the supply voltage in order to resume the normal power supply via the second control means when the load current of the motor is less than the reference value, in a case where the fourth control means is operated.

20. The portable drilling device according to claim 13, further comprising a fixing unit including a magnet for fixing the drilling device body including the motor to a workpiece with an electromagnetic force, and wherein the main control unit rotationally drives the motor by means of the motor control unit according to a state in which the magnet is energized.

* * * * *